United States Patent

Tanaka

Patent Number: 5,325,236
Date of Patent: Jun. 28, 1994

[54] ULTRA-WIDE-ANGLE TYPE ZOOM LENS

[75] Inventor: Tsunefumi Tanaka, Kanagawa, Japan

[73] Assignee: Canon Kabushiki Kaisha, Tokyo, Japan

[21] Appl. No.: 842,504

[22] Filed: Feb. 27, 1992

[30] Foreign Application Priority Data

Mar. 4, 1991 [JP] Japan .................. 3-037419

[51] Int. Cl.⁵ .................. G02B 15/14; G02B 13/18
[52] U.S. Cl. .................. 359/689; 359/684; 359/708
[58] Field of Search .................. 359/684, 688, 689, 708

[56] References Cited

U.S. PATENT DOCUMENTS

| | | | |
|---|---|---|---|
| 4,054,372 | 10/1977 | Schröeder | 359/688 X |
| 4,135,786 | 1/1979 | Ikamori | 359/688 X |
| 4,696,553 | 9/1987 | Tsuji et al. | 359/688 X |
| 4,776,680 | 10/1988 | Tanaka | 350/427 |
| 4,830,477 | 5/1989 | Takahashi et al. | 350/428 |
| 4,865,434 | 9/1989 | Matsushita et al. | 350/430 |
| 5,059,007 | 10/1991 | Tanaka | 359/676 |

FOREIGN PATENT DOCUMENTS

| | | |
|---|---|---|
| 49-2548 | 1/1974 | Japan . |
| 52-26236 | 2/1977 | Japan . |
| 190917 | 11/1982 | Japan . |

Primary Examiner—Scott J. Sugarman
Attorney, Agent, or Firm—Fitzpatrick, Cella, Harper & Scinto

[57] ABSTRACT

An ultra-wide-angle type zoom lens is disclosed, comprising, in the order from the object side, a negative first lens unit, a negative second lens unit and a positive third lens unit, wherein zooming from the wide-angle end to the telephoto end is performed by differentially moving the second and third lens units.

8 Claims, 9 Drawing Sheets

ULTRA-WIDE-ANGLE TYPE ZOOM LENS

BACKGROUND OF THE INVENTION

1. Field of the Invention

This invention relates to zoom lenses suited to be used as the photographic lens for single-lens reflex cameras, video cameras, or still video cameras and, more particularly, to a zoom lens adapted to an extremely wide angle of view.

2. Description of the Related Art

When a zoom lens is designed to have its maximum angle of view increased, it is common to employ a refractive power arrangement having a negative lens unit positioned at the front, i.e., the so-called negative lead type. For example, Japanese Laid-Open Patent Application No. Sho 49-2548 discloses a 2-unit form of wide-angle zoom lens having negative and positive refractive powers in this order from the front. With the use of the 2-unit form, zoom lenses of even wider angle of view are proposed in Japanese Laid-Open Patent Applications No. Sho 52-26236 and No. Sho 57-190917.

However, Japanese Laid-Open Patent Application No. Sho 57-190917 mentioned above only shows a temperate idea in that the zoom lens has a zoom ratio of 1.7 or so and its maximum angle of view is limited to 94° or less.

By the way, although the increase of the angle of view to 100° or wider has already been achieved in the field of fixed focal length lenses, it is in the field of zoom lenses that such an ultra-wide-angle lens is not yet achievable in the present state of art. This is attributable to the fact that a much-desired increase of the maximum angle of view may be attained by strengthening a refractive power of each of the negative and positive lens units, but, if so, it becomes extremely difficult to sustain good optical performance under the condition that the back focal distance is kept at a predetermined value. Particularly, astigmatism and distortion are very difficult to correct well.

SUMMARY OF THE INVENTION

The present invention is to solves such a problem and its object is to provide an ultra-wide-angle type zoom lens whose angle of view at the wide-angle end exceeds 100°, being, for example, 112° or thereabout, or equivalent to a focal length of 14 mm or thereabout in the 35 mm Leica format.

To attain the above object, an ultra-wide-angle type zoom lens according to the invention comprises a first lens unit having a negative refractive power, a second lens unit having a negative refractive power and a third lens unit having a positive refractive power, wherein the second lens unit and the third lens unit are moved differentially along an optical axis to effect zooming.

DETAILED DESCRIPTION OF THE PREFERRED EMBODIMENTS

Figure 1:
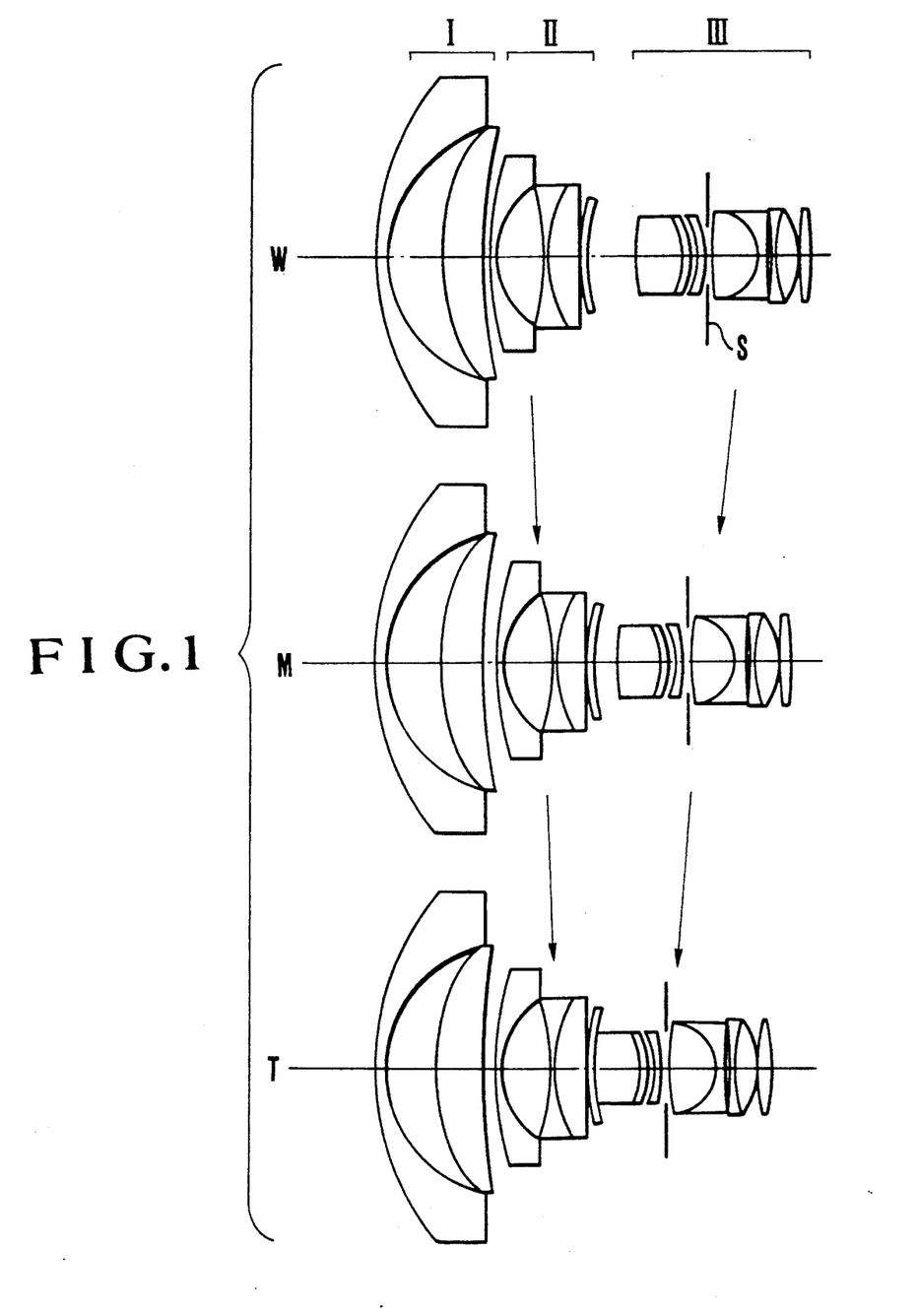
FIG. 1 is a longitudinal section view of a numerical example 1 of an ultra-wide-angle type zoom lens according to the invention.
Figure 2A:
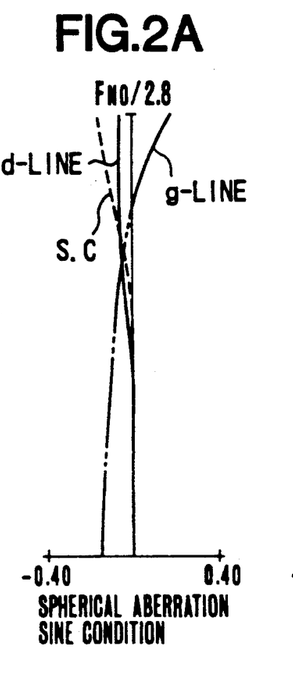
FIGS. 2A, 2B, and 2C are graphic representations of the various aberrations of the numerical example 1 of the invention in the wide-angle end.
Figure 2B:
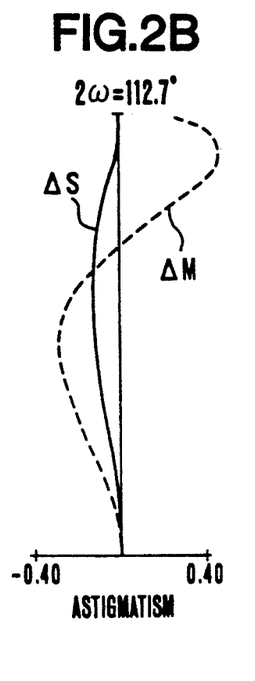
Figure 2C:
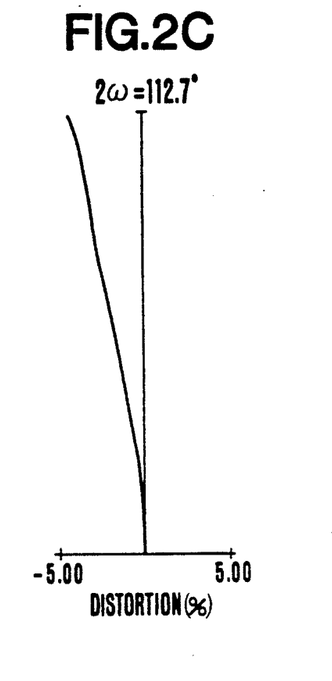
Figure 3A:
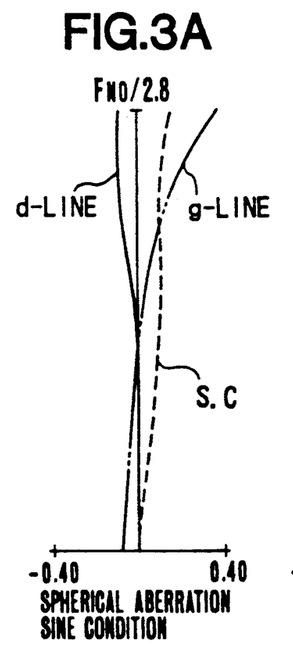
FIGS. 3A, 3B, and 3C are graphic representations of the various aberrations of the numerical example 1 of the invention in the middle focal length region.
Figure 3B:
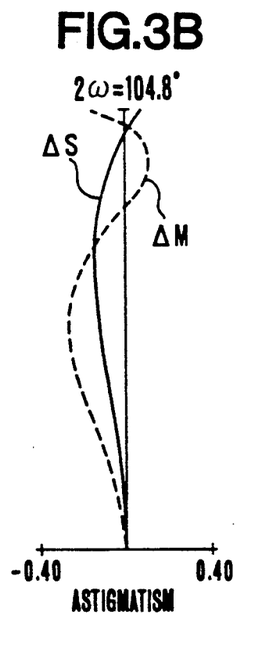
Figure 3C:
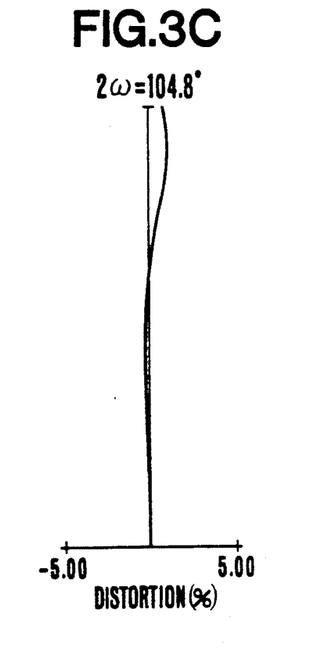
Figure 4A:
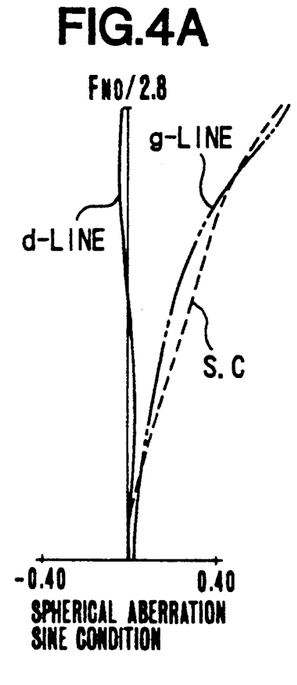
FIGS. 4A, 4B, and 4C are graphic representations of the various aberrations of the numerical example 1 of the invention in the telephoto end.
Figure 4B:
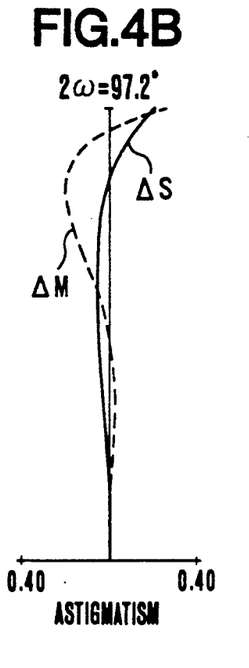
Figure 4C:
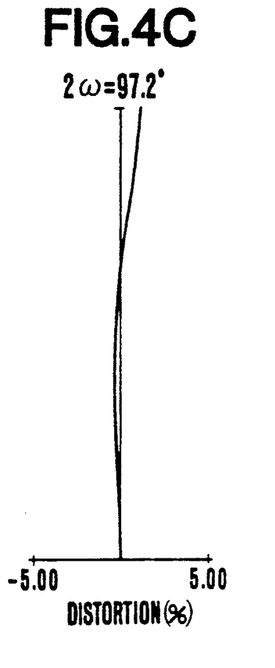
Figure 5:
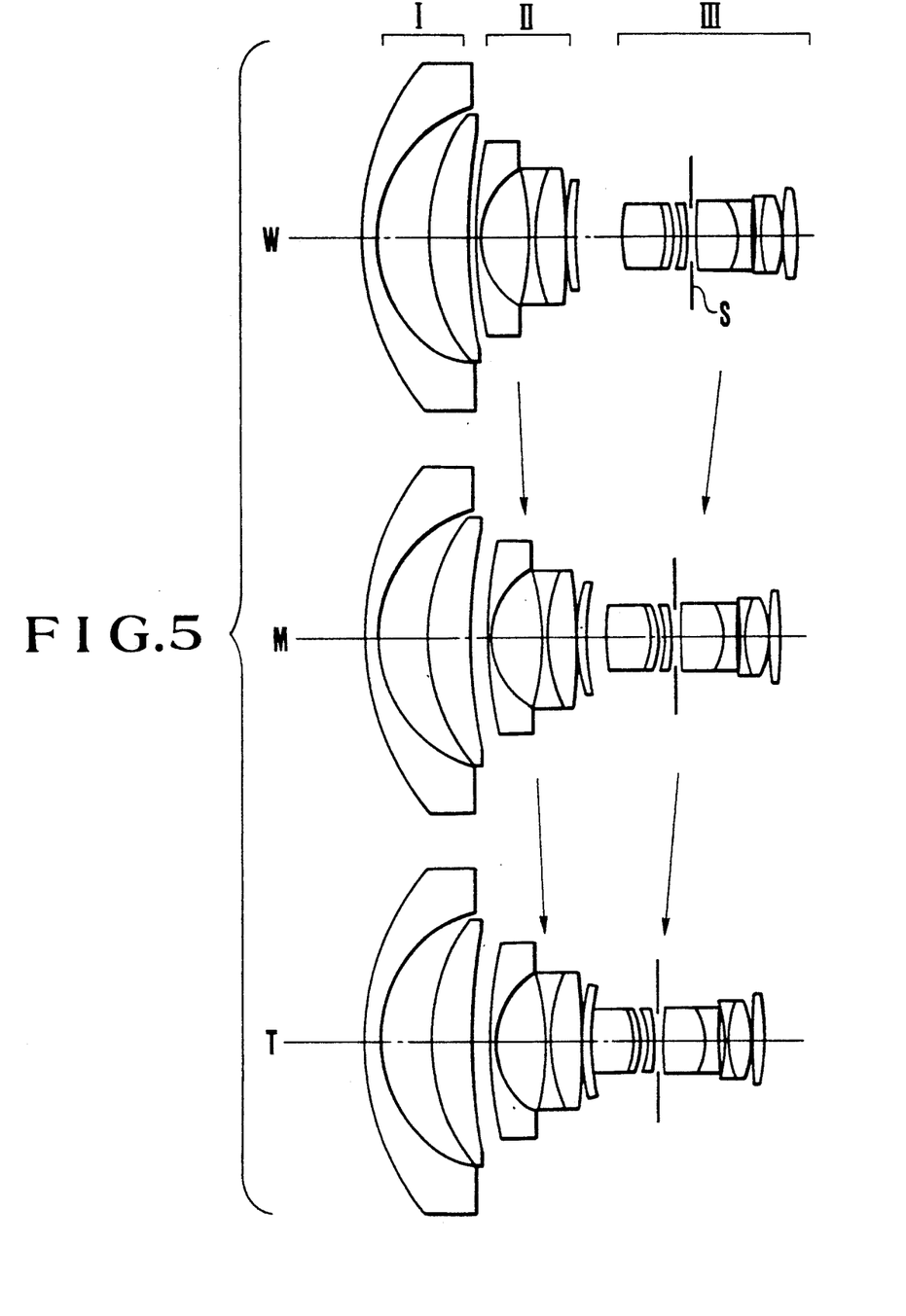
FIG. 5 is a longitudinal section view of a numerical example 2 of the ultra-wide-angle type zoom lens according to the invention.
Figure 6A:
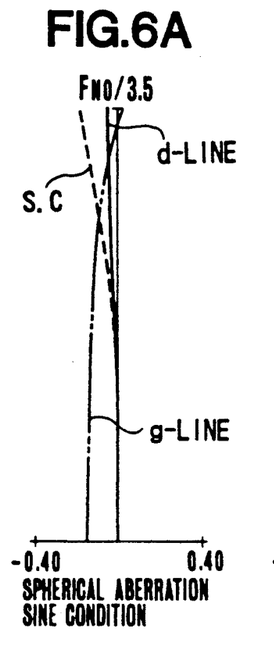
FIGS. 6A, 6B, and 6C are graphic representations of the various aberrations of the numerical example 2 of the invention in the wide-angle end.
Figure 6B:
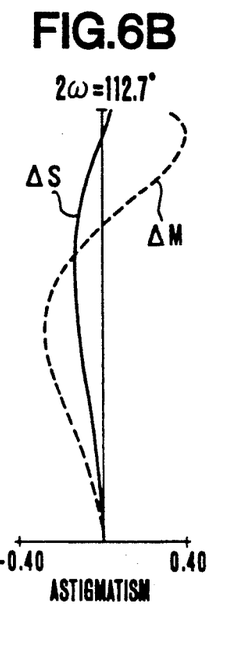
Figure 6C:
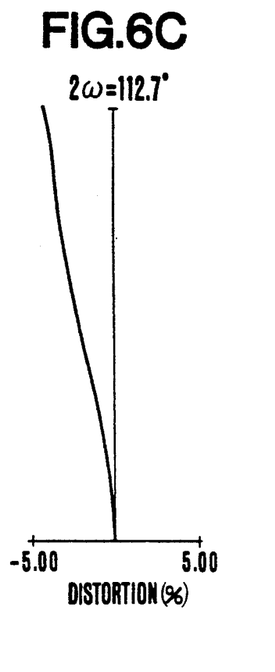
Figure 7A:
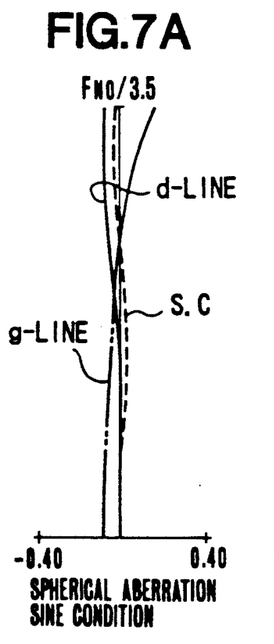
FIGS. 7A, 7B, and 7C are graphic representations of the various aberrations of the numerical example 2 of the invention in the middle focal length region.
Figure 7B:
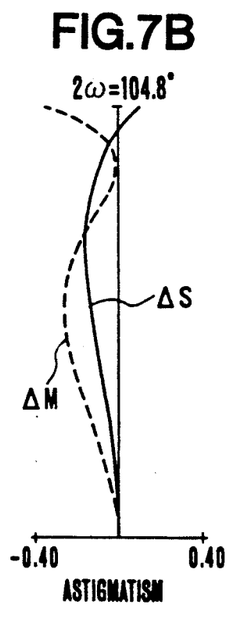
Figure 7C:
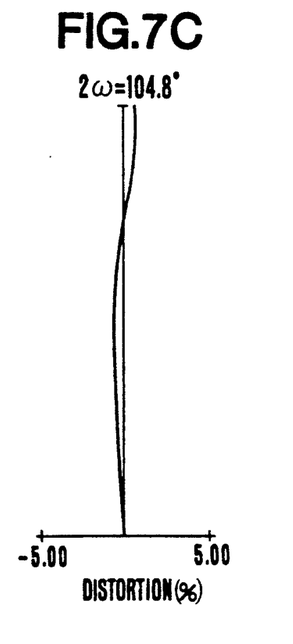
Figure 8A:
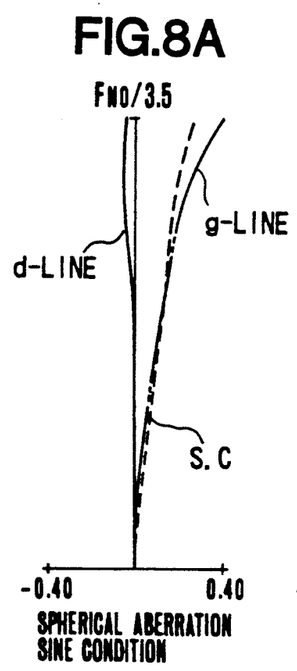
FIGS. 8A, 8B, and 8C are graphic representations of the various aberrations of the numerical example 3 of the invention in the telephoto end.
Figure 8B:
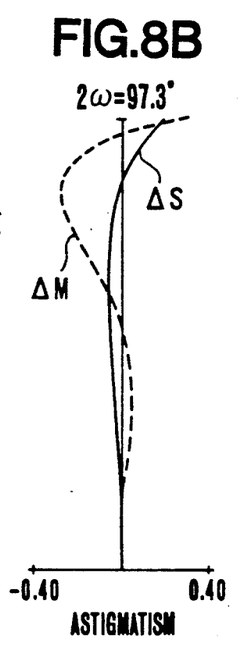
Figure 8C:
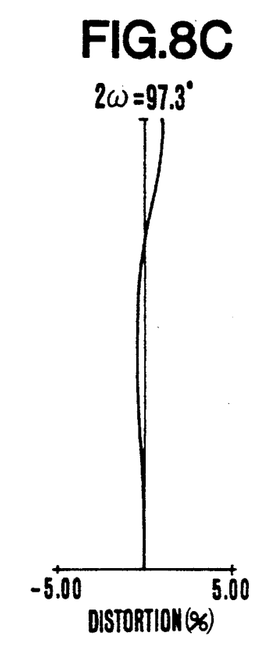
Figure 9:
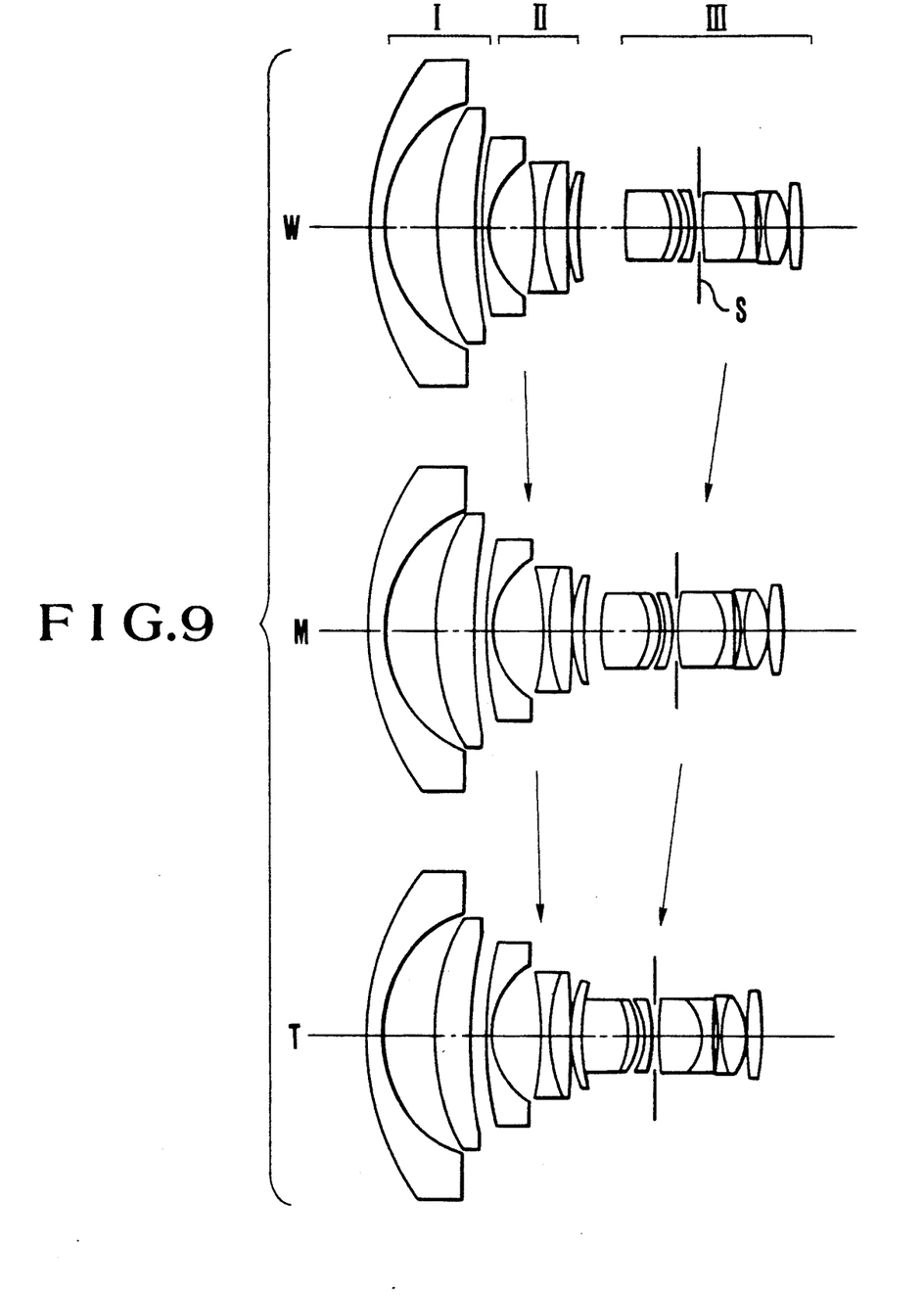
FIG. 9 is a longitudinal section view of a numerical example 3 of the ultra-wide-angle type zoom lens of the invention.
Figure 10A:
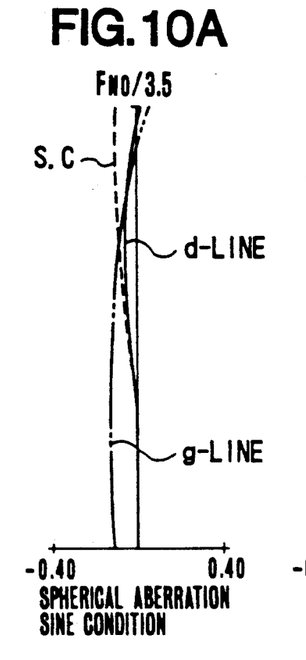
FIGS. 10A, 10B, and 10C are graphic representations of the various aberrations of the numerical example 3 of the invention in the wide-angle end.
Figure 10B:
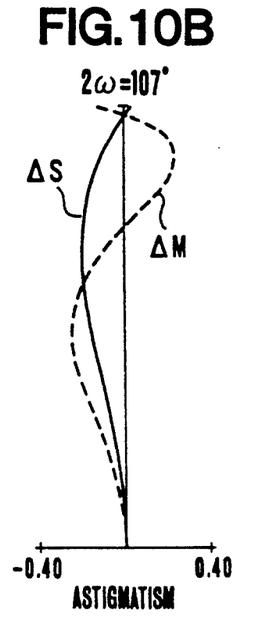
Figure 10C:
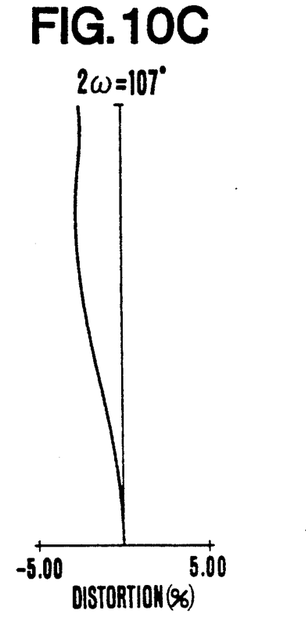
Figure 11A:
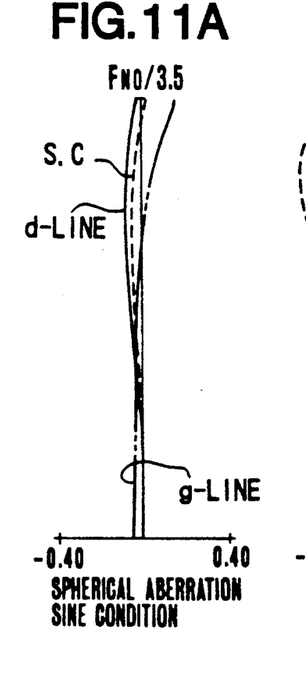
FIGS. 11A, 11B, and 11C are graphic representations of the various aberrations of the numerical example 3 of the invention in a middle focal length region.
Figure 11B:
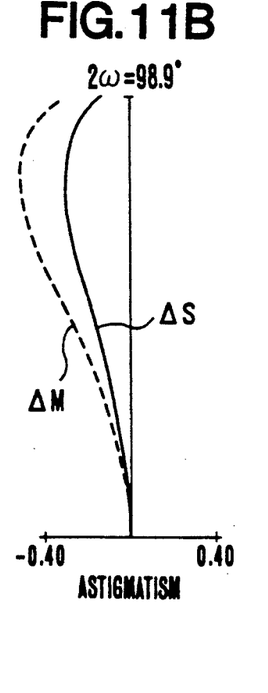
Figure 11C:
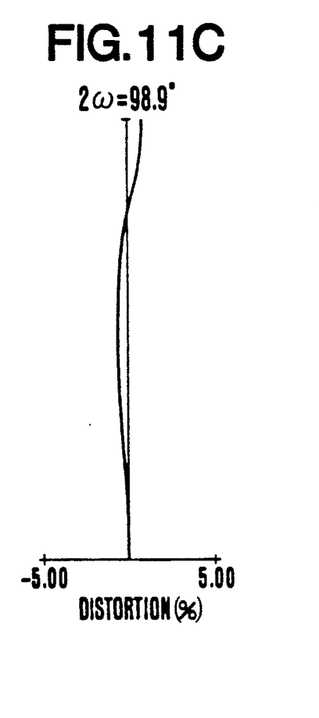
Figures 12A, 12B:
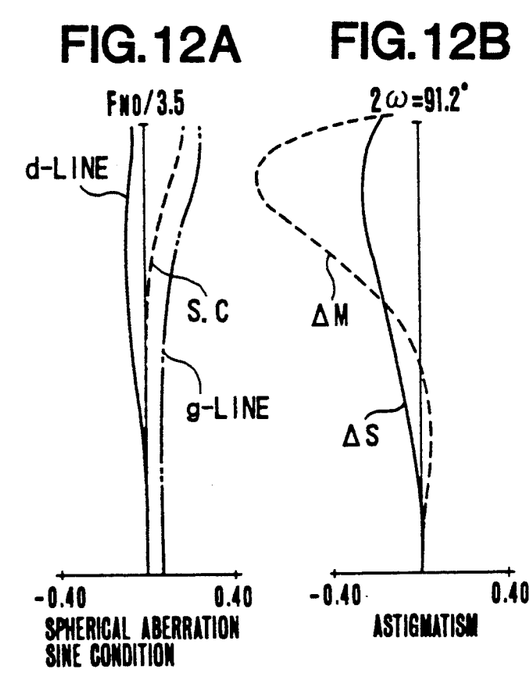
FIGS. 12A, 12B, and 12C are graphic representations of the various aberrations of the numerical example 3 of the invention in the telephoto end.
Figure 12C:
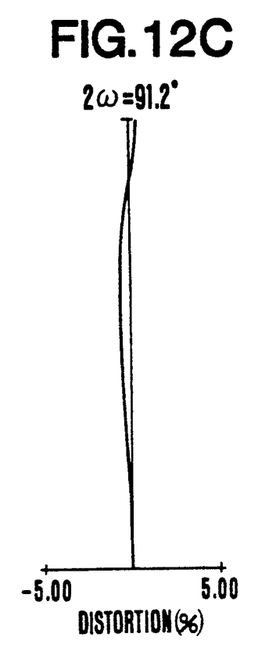

The present invention is next described in connection with embodiments thereof by reference to the drawings. In FIGS. 1, 5 and 9, a zoom lens comprises a fixed first lens unit I having a negative refractive power, a second lens unit II having a negative refractive power and a third lens unit III having a positive refractive power. Zooming from the wide-angle end to the telephoto end is performed by moving the second and third lens units as shown by respective arrows, where W stands for the wide-angle end, M for the middle zooming position, T for the telephoto end and S for the stop.

According to the invention, the front two lens units are given negative refractive powers so that in application to, for example, the single-lens reflex camera, the back focal distance is long enough to accommodate a quick-return mirror therein. Also, the first lens unit is made fixed, thereby giving advantages that the first lens unit is easy to use in correcting mainly astigmatism and distortion and that as the second lens group moves along the optical axis for focusing and zooming, it is easy to suppress the variation of aberrations.

In more detail, a principal ray of light enters the first lens unit at a very steep angle. Supposing that the first lens unit is made to move for focusing and zooming, the principal ray of light would vary its position of incidence to a large extent, making it difficult to correct the aberrations. If the first lens unit is fixed, on the other hand, the variation of the position of incidence of the principal ray of light on the first lens unit can be suppressed. In addition, the light passed through the first lens unit can be made to have a gentle angle of incidence and still a lower height of incidence. The light in such a state is permitted to enter the second lens unit, thereby making it easier to suppress the variation of aberrations caused by the movement of the second lens unit.

The above-described features of the invention suffice for accomplishing the object of the invention. Taking into consideration the correction of aberration and minimization of bulk and size of the zoom lens, however, it is desired to satisfy additional features or conditions set forth below:

$$|f_1| > |f_2| \quad (1)$$

$$1.5 < |f_2/f_W| < 3 \quad (2)$$

where $f_1$ and $f_2$ are the focal lengths of the first and second lens units, respectively, and $f_W$ is the shortest focal length of the entire lens system.

The inequality of condition (1) means that the negative power share is strengthened toward the second lens unit. When $|f_2|$ is weakened, the total zooming and focusing movement increases largely. If the space for that movement is secured, the first lens unit would be positioned farther away from the stop, which in turn causes a diameter of the first lens unit to increase. An appropriate value of negative refractive power of the second lens unit in terms of the shortest focal length $f_W$ of the entire lens system is determined by setting the power of the second lens unit so as to satisfy the inequalities of condition (2). When the focal length $f_2$ is larger than the upper limit of the condition (2), i.e., when the power is weakened, the above-described disadvantages are produced. Conversely, when it is strengthened beyond the lower limit, a large variation of astigmatism results. Also, the distortion, particularly, of barrel type on the wide-angle side becomes difficult to correct.

Also, in the present embodiment, the first lens unit is constructed as comprising a negative meniscus lens and a positive lens in this order from the front, wherein the front surface of this positive lens is formed into an aspheric shape such that the positive refractive power gets progressively stronger toward the margin, whereby correction of the distortion is aimed at and also astigmatism is well corrected.

Further, in the present embodiment, the third lens unit is provided with a positive lens whose rear surface is aspherical. Since the aspheric surface of the positive lens in the first lens unit and the aspheric surface of the positive lens in the third lens unit take their places on the opposite sides of the stop to each other, their off-axial light beams are made controllable in each other's relation. Thus, good correction of spherical aberration and coma results, and the sagittal flare is removed.

Next, numerical examples 1 to 3 of the invention are shown. In the numerical data for the examples 1 to 3, Ri is the radius of curvature of the i-th lens surface when counted from the object side, Di is the i-th lens thickness or air separation, and Ni and Ξi are respectively the refractive index and Abbe number of the glass of the i-th lens element.

The shape of an aspheric surface is expressed in the coordinates with an X axis in the axial direction and an H axis in a direction perpendicular to the optical axis, the direction in which light advances being taken as positive, by the following equation:

$$X = (1/R)H^2/(1+(1-(H/R)^2)^{\frac{1}{2}}) + AH^2 + BH^4 + CH^6 + DH^8 + EH$$

where R is the radius of the osculating sphere, and A, B, C, D and E are the aspheric coefficients.

NUMERICAL EXAMPLE 1 (FIGS. 1, 2, 3 and 4)

| F = 14.4 –19.07 | | FNO = 1:2.8 | | 2ω = 112.7° –97.2° | |
|---|---|---|---|---|---|
| R1 = | 53.624 | D1 = | 3.10 | N1 = 1.69680 | ν1 = 55.5 |
| R2 = | 27.052 | D2 = | 11.13 | | |
| *R3 = | 83.794 | D3 = | 8.19 | N2 = 1.60311 | ν2 = 60.7 |
| R4 = | 120.653 | D4 = | Variable | | |
| R5 = | 74.716 | D5 = | 1.30 | N3 = 1.69680 | ν3 = 55.5 |
| R6 = | 16.727 | D6 = | 10.28 | | |
| R7 = | −54.927 | D7 = | 1.27 | N4 = 1.69680 | ν4 = 55.5 |
| R8 = | 30.725 | D8 = | 5.90 | N5 = 1.64769 | ν5 = 33.8 |
| R9 = | −344.990 | D9 = | 0.20 | | |
| R10 = | 36.552 | D10 = | 1.90 | N6 = 1.77250 | ν6 = 49.6 |
| R11 = | 56.139 | D11 = | Variable | | |
| R12 = | 40.595 | D12 = | 9.47 | N7 = 1.56732 | ν7 = 42.8 |
| R13 = | −12.653 | D13 = | 1.42 | N8 = 1.80400 | ν8 = 46.6 |
| R14 = | −17.037 | D14 = | 1.77 | | |
| R15 = | −13.988 | D15 = | 0.90 | N9 = 1.80400 | ν9 = 46.6 |
| R16 = | −35.334 | D16 = | 0.90 | | |
| R17 = | (Stop) | D17 = | 0.90 | | |
| R18 = | 62.790 | D18 = | 9.60 | N10 = 1.65426 | ν10 = 31.4 |
| R19 = | −9.550 | D19 = | 2.27 | N11 = 1.64769 | ν11 = 33.8 |
| R20 = | 257.362 | D20 = | 0.76 | | |
| R21 = | −73.462 | D21 = | 0.78 | N12 = 1.84666 | ν12 = 23.9 |
| R22 = | 27.787 | D22 = | 5.36 | N13 = 1.51633 | ν13 = 64.1 |
| *R23 = | −15.393 | D23 = | 0.10 | | |
| R24 = | 130.763 | D24 = | 1.98 | N14 = 1.77250 | ν14 = 49.6 |
| R25 = | −99.430 | | | | |

| Variable | Focal Length | | |
|---|---|---|---|
| Separation | 14.40 | 16.66 | 19.07 |
| D4 | 1.00 | 2.99 | 3.44 |
| D11 | 10.50 | 4.61 | 0.26 |

VALUES OF THE ASPHERIC COEFFICIENTS

| $R_3 = 8.379 \times 10^1$ | $R_{23} = -1.54 \times 10_1$ |
|---|---|
| A = 0 | A = 0 |
| B = $1.2297 \times 10^{-5}$ | B = $1.08433 \times 10^{-5}$ |
| C = $-6.00163 \times 10^{-10}$ | C = $-2.77037 \times 10^{-8}$ |
| D = $-9.79776 \times 10^{-12}$ | D = $2.87016 \times 10^{-10}$ |
| E = $1.89956 \times 10^{-14}$ | E = $-1.85195 \times 10^{-13}$ |

NUMERICAL EXAMPLE 2 (FIGS. 5, 6, 7 and 8)

| F = 14.4 –19.05 | | FNO = 1:3.5 | | 2ω = 112.7° -97.3° | |
|---|---|---|---|---|---|
| R1 = | 54.320 | D1 = | 3.10 | N1 = 1.69680 | ν1 = 55.5 |
| R2 = | 27.059 | D2 = | 11.19 | | |
| *R3 = | 84.636 | D3 = | 8.20 | N2 = 1.60311 | ν2 = 60.7 |
| R4 = | 123.387 | D4 = | Variable | | |
| R5 = | 72.541 | D5 = | 1.30 | N3 = 1.69680 | ν3 = 55.5 |
| R6 = | 16.611 | D6 = | 10.31 | | |
| R7 = | −55.899 | D7 = | 1.39 | N4 = 1.69680 | ν4 = 55.5 |
| R8 = | 30.424 | D8 = | 6.20 | N5 = 1.64769 | ν5 = 33.8 |
| R9 = | −352.907 | D9 = | 0.20 | | |
| R10 = | 36.715 | D10 = | 1.92 | N6 = 1.77250 | ν6 = 49.6 |
| R11 = | 56.139 | D11 = | Variable | | |
| R12 = | 40.039 | D12 = | 9.13 | N7 = 1.56732 | ν7 = 42.8 |
| R13 = | −12.627 | D13 = | 1.38 | N8 = 1.80400 | ν8 = 46.6 |
| R14 = | −17.039 | D14 = | 1.72 | | |
| R15 = | −13.996 | D15 = | 0.90 | N9 = 1.80400 | ν9 = 46.6 |
| R16 = | −34.952 | D16 = | 0.90 | | |
| R17 = | (Stop) | D17 = | 0.90 | | |
| R18 = | 62.354 | D18 = | 9.67 | N10 = 1.65426 | ν10 = 31.4 |
| R19 = | −9.773 | D19 = | 2.41 | N11 = 1.64769 | ν11 = 33.8 |
| R20 = | 266.194 | D20 = | 0.76 | | |
| R21 = | −73.800 | D21 = | 0.81 | N12 = 1.84666 | ν12 = 23.9 |
| R22 = | 27.770 | D22 = | 5.33 | N13 = 1.51633 | ν13 = 64.1 |
| *R23 = | −15.402 | D23 = | 0.10 | | |
| R24 = | 131.617 | D24 = | 2.01 | N14 = 1.77250 | ν14 = 49.6 |
| R25 = | −106.080 | | | | |

| Variable | Focal Length | | |
|---|---|---|---|
| Separation | 14.40 | 16.66 | 19.07 |
| D4 | 1.00 | 2.98 | 3.41 |
| D11 | 10.50 | 4.62 | 0.29 |

VALUES OF THE ASPHERIC COEFFICIENTS

| $R_3$ = 8.464 × 10$^1$ | $R_{23}$ = −1.54017 × 10$^1$ |
|---|---|
| A = 0 | A = 0 |
| B = 1.21747 × 10$^{-5}$ | B = 1.05046 × 10$^{-5}$ |
| C = −6.66817 × 10$^{-10}$ | C = −2.51878 × 10$^{-8}$ |
| D = −9.79462 × 10$^{-12}$ | D = 3.07080 × 10$^{-10}$ |
| E = 1.90943 × 10$^{-14}$ | E = −1.84711 × 10$^{-13}$ |

NUMERICAL EXAMPLE 3 (FIGS. 9, 10, 11 and 12)

| F = 16 –21.19 | | FNO = 1:3.5 | | 2ω = 107°-91.2° | |
|---|---|---|---|---|---|
| R1 = | 54.552 | D1 = | 3.10 | N1 = 1.69680 | ν1 = 55.5 |
| R2 = | 26.750 | D2 = | 10.78 | | |
| *R3 = | 82.495 | D3 = | 8.08 | N2 = 1.60311 | ν2 = 60.7 |
| R4 = | 127.240 | D4 = | Variable | | |
| R5 = | 68.251 | D5 = | 1.30 | N3 = 1.69680 | ν3 = 55.5 |
| R6 = | 16.227 | D6 = | 10.58 | | |
| R7 = | −55.389 | D7 = | 1.90 | N4 = 1.69680 | ν4 = 55.5 |
| R8 = | 39.316 | D8 = | 4.58 | N5 = 1.64769 | ν5 = 33.8 |
| R9 = | −234.308 | D9 = | 0.20 | | |
| R10 = | 34.477 | D10 = | 1.92 | N6 = 1.77250 | ν6 = 49.6 |
| R11 = | 56.139 | D11 = | Variable | | |
| R12 = | 39.553 | D12 = | 9.53 | N7 = 1.56732 | ν7 = 42.8 |
| R13 = | −12.847 | D13 = | 2.06 | N8 = 1.80400 | ν8 = 46.6 |
| R14 = | 16.882 | D14 = | 1.57 | | |
| R15 = | −14.071 | D15 = | 0.90 | N9 = 1.80400 | ν9 = 46.6 |
| R16 = | −34.056 | D16 = | 0.90 | | |
| R17 = | (Stop) | D17 = | 0.90 | | |
| R18 = | 62.516 | D18 = | 9.52 | N10 = 1.65426 | ν10 = 31.4 |
| R19 = | −8.425 | D19 = | 2.10 | N11 = 1.64769 | ν11 = 33.8 |
| R20 = | 234.408 | D20 = | 0.74 | | |
| R21 = | −72.124 | D21 = | 0.67 | N12 = 1.84666 | ν12 = 23.9 |
| R22 = | 26.741 | D22 = | 5.17 | N13 = 1.51633 | ν13 = 64.1 |
| *R23 = | −15.383 | D23 = | 0.10 | | |
| R24 = | 133.778 | D24 = | 2.72 | N14 = 1.77250 | ν14 = 49.6 |
| R25 = | −158.302 | | | | |

| Variable | Focal Length | | |
|---|---|---|---|
| Separation | 16.00 | 18.52 | 21.19 |
| D4 | 1.00 | 2.77 | 3.00 |
| D11 | 10.50 | 4.63 | 0.30 |

VALUES OF THE ASPHERIC COEFFICIENTS

| $R_3$ = 8.24949 × 10$^{10}$ | $R_{23}$ = −1.53823 × 10$^1$ |
|---|---|
| A = 0 | A = 0 |
| B = 1.18772 × 10$^{-5}$ | B = 1.00309 × 10$^{-5}$ |
| C = −6.47961 × 10$^{-5}$ | C = 5.01593 × 10$^{-9}$ |
| D = −9.03683 × 10$^{-12}$ | D = 3.07479 × 10$^{-10}$ |
| E = 1.90819 × 10$^{-14}$ | E = 2.97895 × 10$^{-13}$ |

It will be appreciated from the foregoing description that according to the invention, an ultra-wide-angle type zoom lens can be realized with the limitation of the amount of distortion and other aberrations to a minimum.

Also, the use of the second lens unit moving along an optical axis for focusing and zooming provides a possibility of constructing the zoom lens, despite of the ultra-wide-angle type, in compact form.

What is claimed is:

1. A wide-angle type zoom lens comprising:
   in the order from an object side,
   a first lens unit, which is closest to the object side, having a negative refractive power;
   a second lens unit having a negative refractive power; and
   a third lens unit having a positive refractive power,
   wherein said second lens unit and said third lens unit are made to move differentially for zooming.

2. A wide-angle type zoom lens according to claim 1, wherein focusing is performed by moving said second lens unit.

3. A wide-angle type zoom lens according to claim 1, satisfying the following conditions:

$$|f_1| > |f_2|$$

$$1.5 < |f_2/f_W| < 3$$

where $f_1$ and $f_2$ are focal lengths of said first and second lens units, respectively, and $f_W$ is the shortest focal length of the entire lens system.

4. A wide-angle type zoom lens according to claim 1, wherein said first lens unit comprises a negative meniscus lens and a positive lens having an aspheric surface facing the object side.

5. A wide-angle type zoom lens according to claim 4, wherein said aspheric surface of said positive lens is in such a shape that a positive refractive power gets progressively stronger toward a margin.

6. A wide-angle type zoom lens according to claim 5, wherein said third lens unit includes a positive lens having an aspheric surface facing an image side.

7. A wide-angle type zoom lens according to claim 6, wherein said positive lens of said third lens unit is positioned on the image side of a stop.

8. A wide-angle type zoom lens comprising:
   in the order from an object side,
   a first lens unit, which is closest to the object side, having a negative refractive power;
   a second lens unit having a negative refractive power; and
   a third lens unit having a positive refractive power,
   wherein said first lens unit is fixed and said second lens unit and said third lens unit are made to move differentially for zooming.

* * * * *

UNITED STATES PATENT AND TRADEMARK OFFICE
CERTIFICATE OF CORRECTION

PATENT NO. : 5,325,236
DATED : June 28, 1994
INVENTOR(S) : Tsunefumi Tanaka

It is certified that error appears in the above-indentified patent and that said Letters Patent is hereby corrected as shown below:

On the title page:

<u>At [56], Under The Heading "U.S. PATENT DOCUMENTS":</u>
"Ikanori" should read --Ikemori--.

<u>COLUMN 1:</u>
Line 44, "is to" should be deleted.

<u>COLUMN 4:</u>
Line 9, "$\Xi i$" should read --$\nu i$--.
Line 19, "$+AH^2+BH^4+CH^6+DH^8+EH$" should read
--$+AH^2+BH^4+CH^6+DH^8+EH^{10}$--.

<u>COLUMN 4, V.A.C. TABLE:</u>
Line 1, "$R_{23} = -1.54 \times 10_1$" should read --$R_{23} = -1.54 \times 10^1$--.
Line 3, "$B=1.08433 \times 10^{=5}$" should read --$B=1.08433 \times 10^{-5}$--.

<u>COLUMN 5, V.A.C. TABLE:</u>
Line 3, "$B=1.21747 \times 10^{-5}$" should read -- $B = 1.21747 \times 10^{-5}$--.

Signed and Sealed this

Twenty-seventh Day of December, 1994

Attest:

BRUCE LEHMAN

*Attesting Officer*            *Commissioner of Patents and Trademarks*